United States Patent [19]

Lazzari et al.

[11] 4,194,110

[45] Mar. 18, 1980

[54] LOCALIZED-FIELD STATIC MAGNETIZING DEVICE

[75] Inventors: Jean P. Lazzari, Montfort L'Amaury; Michel Helle, Marcq, both of France

[73] Assignee: Compagnie Internationale pour l'Informatique, Paris, France Cll-Honeywell Buel (Societe Anonyme)

[21] Appl. No.: 880,331

[22] Filed: Feb. 23, 1978

[30] Foreign Application Priority Data

Mar. 31, 1977 [FR] France .................................. 77 09823

[51] Int. Cl.² ...................... G06K 7/08; G06K 19/06; G11B 5/09; G11B 5/02
[52] U.S. Cl. .................................. 235/450; 235/493; 360/44; 360/55; 360/110
[58] Field of Search ........................ 360/16, 110, 2, 55, 360/66, 113, 17, 39; 235/449, 450, 493; 360/40, 44, 55

[56] References Cited

U.S. PATENT DOCUMENTS

| | | | |
|---|---|---|---|
| 3,025,503 | 3/1962 | Perry | 360/44 |
| 3,100,834 | 8/1963 | Demer | 235/493 |
| 3,409,853 | 11/1968 | Guerth | 360/16 |
| 3,613,101 | 10/1971 | Leonard et al. | 235/493 |

Primary Examiner—Daryl W. Cook
Attorney, Agent, or Firm—Cameron, Kerkam, Sutton, Stowell & Stowell

[57] ABSTRACT

A localized-field static magnetizing device consists of a non-magnetic substrate having a magnetic layer thereon that contains a succession of adjoining zones of alternately differing lengths and having magnetic inductions of alternately opposing directions. One of the lengths is much greater than the other and the magnetic layer has a high coercive field.

21 Claims, 6 Drawing Figures

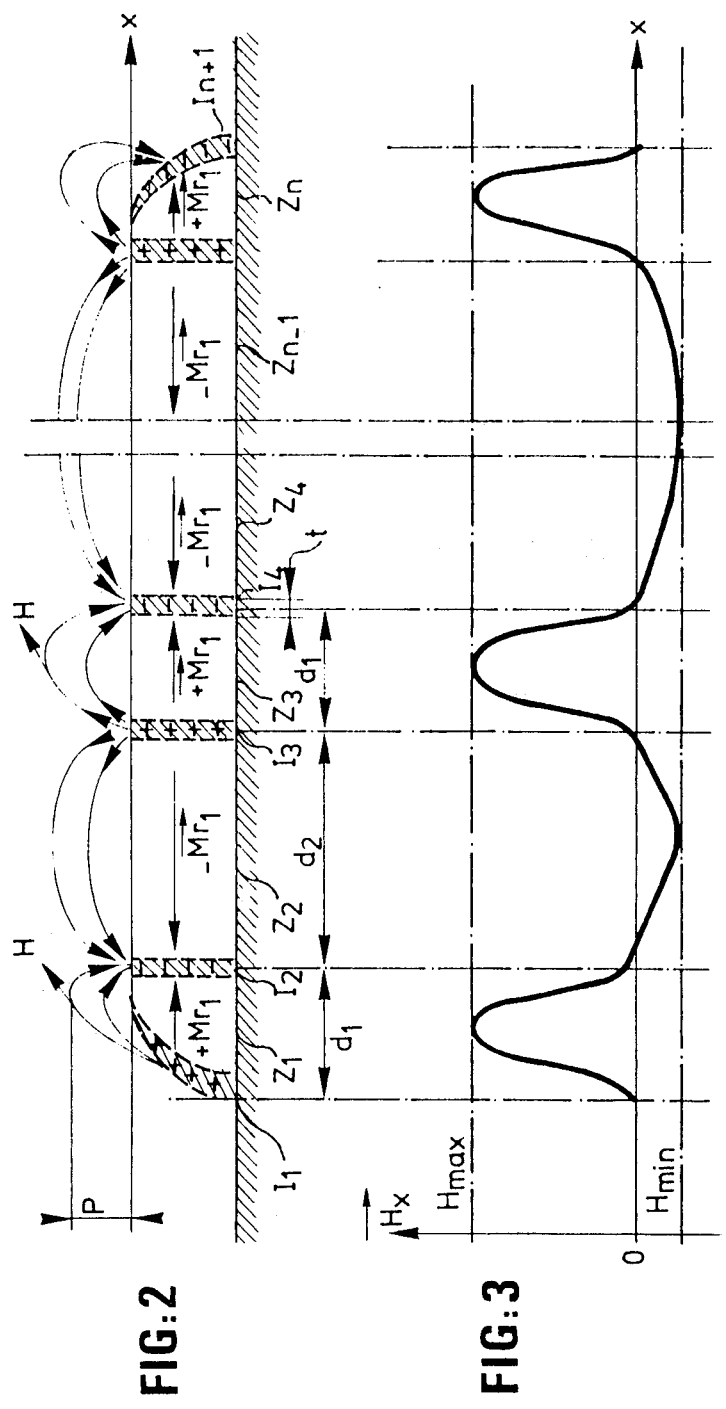

LOCALIZED-FIELD STATIC MAGNETIZING DEVICE

BACKGROUND OF THE INVENTION

1. Field of the Invention

The present invention relates to a localized-field static magnetizing device. It is applicable in particular to arrangements for reading coded magnetic information such as check-reading arrangements.

2. Description of the Prior Art

It is known that present day data-processing systems often include data infeed arrangements which make use of slips bearing coded magnetic information. These slips may for example be bank checks, giro checks or credit cards.

The information generally consists of a succession of alpha-numeric characters printed on the slips, that is to say a succession of letters of the alphabet, figures, punctuation marks, etc., which indicate, in the case where the slip is a check for example, the number of the check or the account number of the drawer of the check.

Each character is formed by a set of bars composed of magnetic ink. The number of bars, the distance between the bars, and their relative disposition are unique to each character and are coded in accordance with known codes such as the CMC7 code for example.

An example will be considered of a check and a corresponding data-infeed device which is termed "a check reader". The check reader converts the coded magnetic information given by the characters printed on the check into a succession of electrical signals. It is connected to electronic shaping circuits which convert this succession of electrical signals into a succession of square-wave electrical pulses which are transmitted to electronic circuits for recognizing the characters printed on the check. As soon as the characters corresponding to this succession of square-wave electrical pulses have been identified, it is possible, by means of a calculating unit in the data-processing system at which the check reader forms a part, to cause operations relating to the check to be performed such as debit or credit operations, the operation of updating the account of the drawer, and so on.

So that the subject of the invention may be better understood, it is necessary to review the following facts about magnetism.

To magnetize a magnetic material, the material is first subjected to a positive magnetic field whose intensity is sufficient to saturate the material, that is to say for the magnetic induction in the material to reach a limiting value $B_s$. The magnetic field is then reduced to zero. There then remains a magnetic induction of a level other than zero ($+M_r$) termed the residual magnetic induction, which is characteristic of the material. In other words, magnetizing a magnetic material amounts to saturating it magnetically.

It will be also recalled that if a negative magnetic field is then applied to this material, the magnetic induction in the material will fall to zero at a value of $\vec{H}$ termed the coercive field value $\vec{H}_c$. The curve representing the change in the magnetic induction as a function of the field $\vec{H}$ is termed a hysteresis loop.

It will further be recalled that a magnetic material which has been magnetized creates in the immediate vicinity on its surface a magnetic leakage field which can be shown to be a function of the coercive field $\vec{H}_c$ and which is theoretically at most equal to the latter. In practice the leakage field is always less than the coercive field.

Check readers generally include:

a magnetizing device to magnetize the bars making up the characters printed on the check.

a magnetic transducer device sensitive to the magnetic leakage field created by the bars which have been magnetized by the magnetizing device, which emits, in response to this magnetic leakage field, an electrical signal which is transmitted to the aforementioned electronic shaping circuits.

The check is moved by a mechanical check transporting device and its position in the latter is such that all the bars forming the characters pass in succession across the front of the magnetizing device and the magnetic transducer device in close proximity thereto. It is in fact necessary to magnetize the bars before passing them in front of the magnetic transducer device since, when the characters are printed on the check, either the induction in the bars is zero or else the level and sense of the magnetic induction within the bars vary from one bar to the next. It will be appreciated that the object of the magnetizing device is to cause the level and sense of the magnetic induction to be identical in all the bars, so that it is equal to the residual induction of the magnetic ink from which they are formed.

In present day pratice, magnetizing devices are formed by a magnetic head made up of a magnetic core around which is wound a winding and which is provided with a wide air gap. The bars pass close to the air gap at a very small distance therefrom. A constant current is caused to flow in the windings and this creates a magnetic field in the magnetic core. That proportion of the lines of force of the magnetic field which close outside the air gap on a level therewith and which represent the magnetic leakage, cause the bars to become magnetized provided that the amperage of the current in the winding is sufficiently high. It will be appreciated that under these conditions the electro-magnetic efficiency of the magnetic head is very low: in effect for a high level of electrical energy applied to the winding, a low level of magnetizing energy is obtained. In addition, such a magnetic head has to be carefully manufactured and is relatively expensive and bulky.

Magnetizing devices are known which overcome these disadvantages. They are formed by a magnetic layer having a high coercive field which is deposited on a nonmagnetic substrate. Layers referred to as having a high coercive field are ones whose coercive field is at least equal to that of the bars.

A layer of this kind creates in the immediate vicinity of its surface a high and restricted magnetic leakage field, (of a few hundred oersteds). It is for this reason that the bars forming the characters on the check are made to pass at a very short distance from the magnetic layer (several tens of microns).

Generally speaking, the magnetic induction created within the bars by the magnetic leakage field of the layer, although considerable, is still less than the saturation induction $B_s$ of the magnetic ink. The result is that the magnetic induction which remains within the bars after they have passed in front of the magnetic layer is less than the residual induction of the magnetic ink. It is clear than, in theory, only layers whose magnetic leakage field is extremely high (of the order of 4 to 5 times the coercive field of the bars) at the distance indicated above, would enable a magnetic induction which is as close as possible to the saturation induction $B_s$, but which still remains lower than it, to be created within the bars. Such layers which need to have a very high coercive field are technically difficult to produce and their cost is high.

SUMMARY OF THE INVENTION

The present invention enables these drawbacks to be reduced or overcome by producing a magnetizing device by dividing a magnetic layer deposited on a non-magnetic substrate into a succession of adjoining zones of alternately differing lengths d1 and d2 which have magnetic inductions of alternately opposing directions. Such a static magnetizing device whose field is very localized is simple to produce and of low cost and its effectiveness in saturating the bars is very much better than that of known magnetizing devices.

In accordance with the invention, the localized-field static magnetizing device which consists of a magnetic layer deposited on a substrate is characterized in that the said layer contains a succession of adjoining zones which are of alternately differing lengths d1, and d2 and whose magnetic inductions are of alternately opposing directions, one of the two lengths being very much greater than the other.

In a preferred embodiment of the invention, the magnetic layer is a layer having a high coercive field.

BRIEF DESCRIPTION OF THE DRAWINGS

Other features and advantages of the invention will become apparent from the following description, which is given by way of non-limiting example, and with reference to the accompanying drawings. In the drawings:

FIG. 1 is a sectional view showing the magnetic ayer of the magnetizing device according to the invention deposited on a non-magnetic substrate, FIG. 2 is an enlarged-scale, fragmentary, sectional view of the magnetizing device of FIG. 1, diagrammatically showing the magnetic layer divided into a succession of adjoining zones of different lengths, FIG. 3 is a distribution curve for the magnetic leakage field of the said magnetic layer projected onto an axis parallel to the surface of the layer.

DESCRIPTION OF THE PREFERRED EMBODIMENTS

Figure 4:
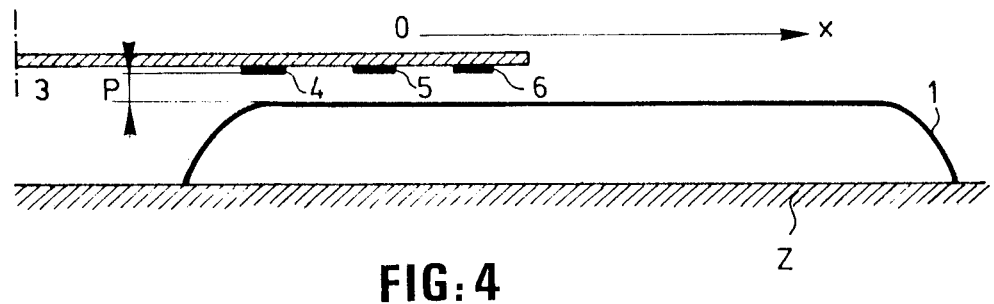
FIG. 4 shows the relative positioning of a check bearing bars of magnetic ink and the magnetizing device according to the invention.

As can be seen in FIG. 1, the localized-field static magnetizing device according to the invention includes a magnetic layer 1, which preferably has a high coercive field and which is deposited by known means, such as vapour deposition in a vacuum, onto a substrate 2 which is preferably but not necessarily made of non-magnetic material. What this means is the substrate should be of a material in which the residual induction is virtually zero. In the embodiment being described, the layer 1 is formed from a compound made up of iron oxide in particle form embedded in a binder, but it is clear that any magnetic material having a high coercive field would be suitable, such as a chrome dioxide compound for example. Such magnetic layers are in any case known.

In accordance with the invention, the magnetic layer 1 contains a succession of zones, $Z_1, Z_2, Z_3, \ldots, Z_{n-1}$, and $Z_n$ in which the magnetic induction is alternately positive and negative, the sign of the induction being decided in a random fashion. The length of the odd zones, $Z_1, Z_3, Z_5, \ldots, Z_n$, which is the same for all such zones is equal to d1, while the length of the even zones $Z_2, Z_4, \ldots, Z_n$ is equal to d2, and is the same for all such zones, with d2 being very much greater than d1.

It will be assumed that the induction is positive in the odd zones and equal to the residual induction $+M_{r1}$ of the magnetic material which forms the layer 1 and that the induction is negative in the even zones and equal to $-M_{r1}$. For convenience, when referring to an even zone in general the designation $Z_j$ will be used and for an odd zone generally the designation $Z_i$ will be used.

Each zone $Z_j$ of positive induction is separated from the adjoining zone $Z_i$ of negative induction by a magnetic space $I_k$ of width t (only the spaces $I_1, I_2, I_3, \ldots, I_{n+1}$ are shown in FIG. 2) in which are concentrated high virtual magnetic charges which are successively positive.

These magnetic charges are positive in spaces $I_1, I_3, \ldots, I_n$ which precede the corresponding positive zones, and negative in spaces $I_2, I_4, \ldots, I_{n+1}$, which follow the corresponding positive zones. Near the layer 1 they produce a magnetostatic leakage field $\vec{H}$ whose lines of force are shown in FIG. 2. It can be seen that the lines of force are orientated in the direction from the positive magnetic charges towards the negative charges. The value of the modulus of the field $\vec{H}$ is a function not only of the density of these charges, but also of the distance which separates each of the magnetic spaces $I_k$ from its neighbors $I_{k-1}$ and $I_{k+1}$.

FIG. 3 shows the distribution, along an axis Ox parallel to the surface of the layer 1, of the modulus of the projected value $\vec{H}x$ of the magnetostatic field $\vec{H}$ on this axis Ox. It can be seen that the modulus of the field $\vec{H}x$ is highest between two adjoining spaces $I_k$ which are spaced apart by the distance d1. In this case the field $\vec{H}x$ is arbitrarily assumed to be positive and is designated $\vec{H}p$. The maximum value of the modulus of the field $\vec{H}x$ is then designated $\vec{H}max$. The modulus of the field $\vec{H}x$ is much less between two adjoining spaces $I_k$ which are spaced apart by the distance d2. In this case the field $\vec{H}x$ in space d2 is arbitrarily assumed to be negative and is designated $\vec{H}q$. The maximum value of the modulus of the field $\vec{H}q$ in space d2 is then designated $\vec{H}min$. Thus, $\vec{H}min < \vec{H}max$.

By way of example, the thickness of the iron oxide magnetic layer 1 is of the order of 50 to 5000 microns, its residual induction $M_{r1}$ is between 500 and 2000 gauss, and its coercive field $H_{c1}$ is close to 2000 oersteds. The distance d1 is of the order of 0.5 to 1 mm whereas d2 is of the order of 2 mm.

In FIG. 4 is seen in cross section a slip 3, such as a bank check, which is moving along the axis Ox (from left to right in FIG. 4), the slip 3 being propelled by a conventional mechanical check transporting device, which is not shown in order to simplify the figure. The slip 3 carries bars 4, 5, 6, of magnetic ink which extend a distance p from the upper edge of the magnetic layer 1.

As they move above the thin magnetic layer 1, the bars will be subjected successively to the positive and negative fields $\vec{H}p$ and $\vec{H}q$ which are created by the zones $Z_1, Z_2, \ldots, Z_n$. The maximum value $\vec{H}max$ of the modulus of the magnetic field $\vec{H}p$ is greater than the maximum value Hmin of the modulus of the field $\vec{H}q$. The process of magnetizing the bars 4 to 6 takes place by a phenomenon termed "reptation" which is illustrated by FIGS. 5 and 6 and is described below.

Figure 5:
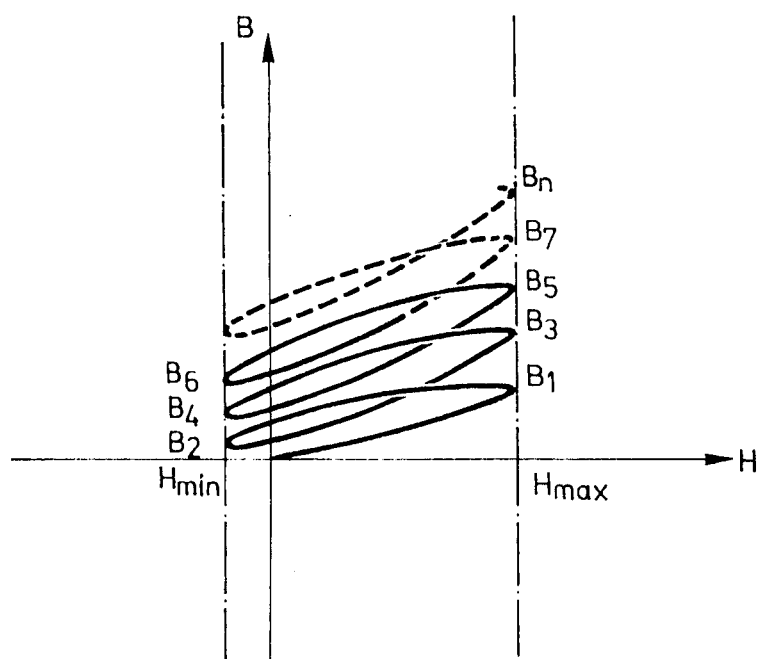
FIGS. 5 and 6 illustrate the process whereby the bars of magnetic ink are magnetized by the magnetizing device according to the invention.
Figure 6:
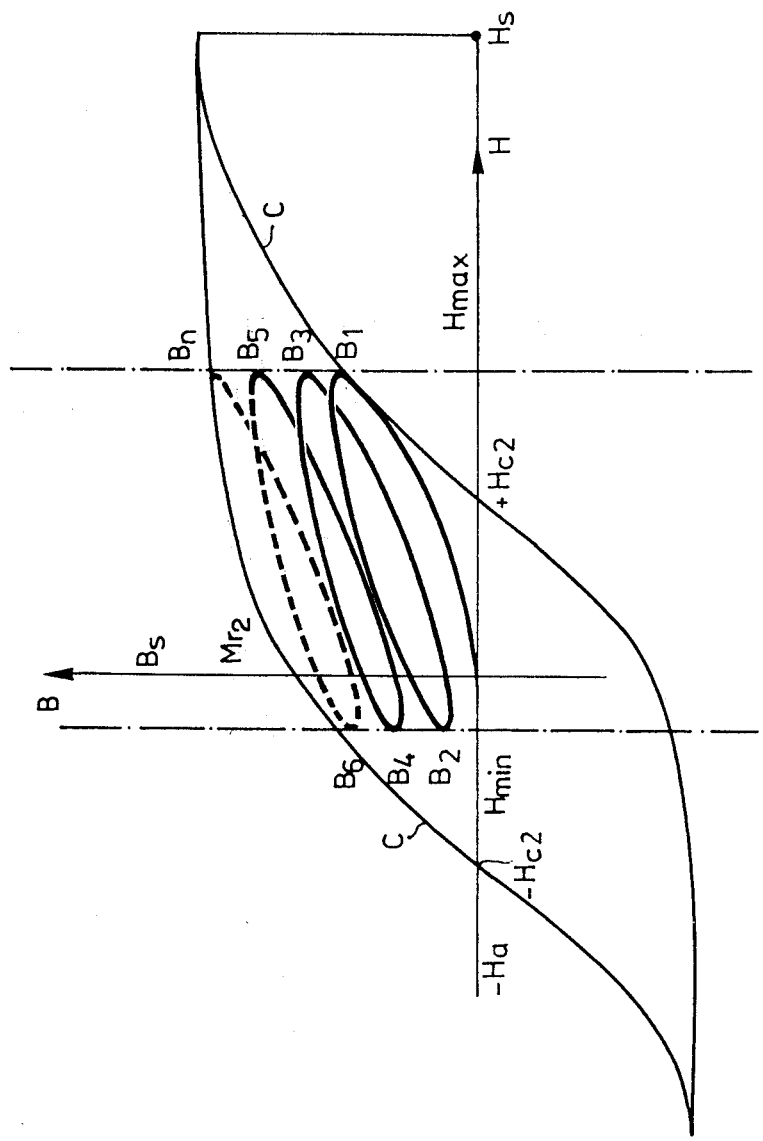

FIG. 5 illustrates the principle of the phenomenon of reptation and FIG. 6 shows how this phenomenon fits into they hysterises loop C for the magnetic ink forming the bars 4 to 6. Bar 4 will be taken as an example. It will be assumed that at the beginning, the induction B in this bar is zero. The bar is then subjected, as it passes above the zone Z1, to a positive magnetic field $\vec{H}p$ having a maximum value $\vec{H}max$. As can be seen in FIG. 6, $\vec{H}max$ is assumed to be higher than the coercive field $\vec{H}c2$ of the ink. The exposition below would however be equally valid if Hmax were lower than $\vec{H}c2$.

The induction in bar 4 will increase from a value of zero to a positive value B1, with the co-ordinate point B1, Hmax situated on the hysteresis loop C. Bar 4 is then subjected, above zone Z2, to a negative magnetic field $\vec{H}q$ whose minimum value is Hmin. The magnetic induction then assumes a value B2, which is less than B1 but is still positive.

Since the operation consisting in subjecting the bar to alternate fields $\vec{H}p$ and $\vec{H}q$ is repeated a number of times as the bar passes above the zones Z3, Z4, . . ., Zn of layer 1, the magnetic induction will thus assume successive values of B3, B4, Bf, B6, B7, . . . , Bn, the point Bn, Hmax being situated on the hysteresis loop C. Bar 4 is then virtually saturated.

After having passed above the magnetic layer 1 the bar is no longer subject to the magnetic fields $\vec{H}p$ and $\vec{H}q$ and the magnetic induction within it then becomes equal to Mr2, which is the natural residual induction of the magnetic material forming the bar.

In other words, it can be said that saturation of the bar 4 is achieved by applying to it a succession of pulsed fields of Hp.

It is clear that the higher is $\vec{H}max$, that is to say the higher is the coercive field Hcl of the layer 1, then the more rapidly is the bar 4 saturated. In practice, the material forming the layer 1 is so selected that $\vec{H}c1$ is between three and five times the coercive field $\vec{H}c2$ of the ink.

The number n of zones in the layer is selected in such a way that by passing above zone Zn the bar becomes saturated, zone Zn having a positive leakage field $\vec{H}p$.

It can be seen from FIG. 6 that the higher is the field value $\vec{H}max$ (the higher is the coercive field $\vec{H}c1$), then the smaller is the number of zones n.

The distance p is selected in such a way that on the one hand the field value Hmax remains high, and preferably higher than $\vec{H}c2$, and on the other hand there is no mechanical contact between the bars and the layer 1, which might damage them.

If FIG. 6 is again referred to, it can be seen that when the fields $\vec{H}p$ and $\vec{H}q$ are applied to the bar 4 a number of times in succession, the magnetic induction finally obtained is much higher than that which would be obtained by only a single application of the field $\vec{H}p$ (when it would only be equal to B1), which would be the case if the layer had only one zone.

It is clear that to obtain a magnetic induction in the bar equal to Bn with a magnetic layer having only one zone, it would be necessary for this layer to have a very high leakage field and one close to the magnetic saturation field Hs for the bar (see FIG. 6), which would make it necessary to use magnetic materials having extremely high coercive fields, which materials are technically difficult to produce and are thus expensive.

The present magnetizing device offers several advantages which should be readily apparent from the foregoing description. For example, it may be deposited on a substrate in the form of a layer by a known technique. The layer 1 is easy to magnetize in zones by means of pole pieces of lengths d1 and d2 for magnetizing zones of equivalent lengths and the process is a rapid one. By virtue of the so-called "reptation" effect, the magnetization of the bars will be more effective than that produced by either a magnetic head or a magnetic layer containing only one zone, as is the current practice.

In addition, the leakage fields of the thin layer 1 are highly confined and are very much localized around the layer, which enables a reading device, such as magnetoresistant element for example, to be positioned on the same substrate in the immediate vicinity of the layer 1. It enables saturation to be achieved in the bars using layers formed from standard magnetic materials which are thus inexpensive. Its cost is in fact very low, being of the order of 20 times less that that of conventional devices employing magnetic heads.

While the invention has been described in connection with a particular embodiment, it should be recognized and apparent that this description is illustrative of the invention and should not be taken as limiting the invention, the true spirit and scope of which is defined by the appended claims.

We claim:

1. A localized-field static magnetizing device comprising a substrate, a magnetic magnetizing layer on said substrate, said magnetic layer having a succession of adjoining zones in which the magnetic induction is alternately positive and negative, said zones being alternately of different lengths d1 and d2, the length of each d1 zone being the same for all such zones, the length of each d2 zone being the same for all such zones, the length of each d2 zone being the same for all such zones, the length d2 being very much greater than the length d1.

2. A lcoalized-field static magnetizing device as set forth in claim 1 wherein the magnetic layer has a high coercive field.

3. A magnetizing device according to claim 1 wherein the substrate is made of a non-magnetic material.

4. A device according to claim 1 wherein the magnetic induction in the shorter zones is positive and equal to the residual induction of the magnetic layer.

5. A device according to claim 1 wherein the magnetic induction in the longer zones is negative and equal in value to the residual induction of the magnetic layer.

6. A device according to claim 4 wherein the magnetic induction in the longer zones is negative and equal in value to the residual induction of the magnetic layer.

7. A device according to claim 1 further including a set of bars of magnetic ink having a coercive field Hc2 positioned at a short distance from the surface of the layer and adapted to pass in front of the said surface.

8. A device according to claim 7 wherein the coercive field Hcl of the layer is higher than the coercive field Hc2 of the bars.

9. A device according to claim 8, wherein the coercive field Hc1 of the layer is between three and five times the coercive field Hc2 of the bars.

10. A device according to claim 9 wherein Hc1 is of the order of 2000 oersteds.

11. A device according to claim 9 wherein the thickness of the magnetic layer is of the order ot 50 to 5000 microns and the length d2 is of the order of 2 to 4 times greater than the length d1.

12. A device according to claim 11 wherein d2 is of the order of 2 mm and d1 is of the order of 0.5 to 1 mm.

13. A device according to claim 1 wherein the thickness of the layer is of the order of 50 to 5000 microns.

14. A device according to claim 1 wherein the length d2 is of the order of 2 to 4 times greater than the length d1.

15. A device according to claim 14 wherein d2 is of the order of 2 mm. and d1 is of the order of 0.5 to 1 mm.

16. A device according to claim 1 wherein the residual induction Mr1 of the layer is of the order of 500 to 2000 gauss and said layer has a coercive field Hc1 of approximately 2000 oersteds.

17. A localized-field static magnetizing device comprising a magnetic layer deposited on a substrate, said layer having a succession of adjoining zones which are alternately of differing lengths d1 and d2, one of which is very much greater than the other, and whose magnetic inductions are alternately of opposing directions and a set of bars of magnetic ink having a coercive field $\bar{H}c2$ positioned at a short distance from the surface of the layer and adapted to pass in front of the said surface.

18. A device according to claim 17 wherein the coercive field Hc1 of the magnetic layer is between three and five times higher than the coercive field $\bar{H}c2$ of the bars.

19. A device according to claim 17 wherein the length d2 is of the order of 2 to 4 times greater than the length d1 and the thickness of said layer is of the order of 50 to 5000 microns.

20. A device according to claim 19 wherein d2 is of the order of 2 mm. and d1 is of the order of 0.5 to 1 mm.

21. A device according to claim 17, wherein said layer has a residual induction Mr1 of the order of 500 to 2000 gauss and a coercive field $\bar{H}c1$ of approximately 2000 oesteds.

* * * * *

UNITED STATES PATENT AND TRADEMARK OFFICE
CERTIFICATE OF CORRECTION

PATENT NO. : 4,194,110
DATED : March 18, 1980
INVENTOR(S) : Jean-Pierre LAZZARI and Michel HELLE It is certified that error appears in the above-identified patent and that said Letters Patent are hereby corrected as shown below:

Claim 1, col. 6, line 37, after "zones" delete "," and insert --and--; line 38, delete "the" (second occurrence); line 39, delete in its entirety.
Claim 2, col. 6, line 42, after "A" correct the spelling of "lcoalized" to read --localized--.

Signed and Sealed this

Seventeenth Day of June 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,194,110
DATED : March 18, 1981
INVENTOR(S) : Jean-Pierre LAZZARI, et al It is certified that error appears in the above-identified patent and that said Letters Patent are hereby corrected as shown below:

ON THE TITLE PAGE:
    (73) "Compagnie Internationale pour l'Informatique,
          Paris, France
          Cii-Honeywell Buel (Societe Anonyme)"
       should be:
       -- Compagnie Internationale pour l'Informatique
          Cii-Honeywell Bull (Societe Anonyme) --.

Signed and Sealed this

Twelfth Day of May 1981

[SEAL]

Attest:

RENE D. TEGTMEYER

Attesting Officer     Acting Commissioner of Patents and Trademark